March 27, 1928. 1,663,571
F. R. SHEDD
TRUCK
Filed April 6, 1927
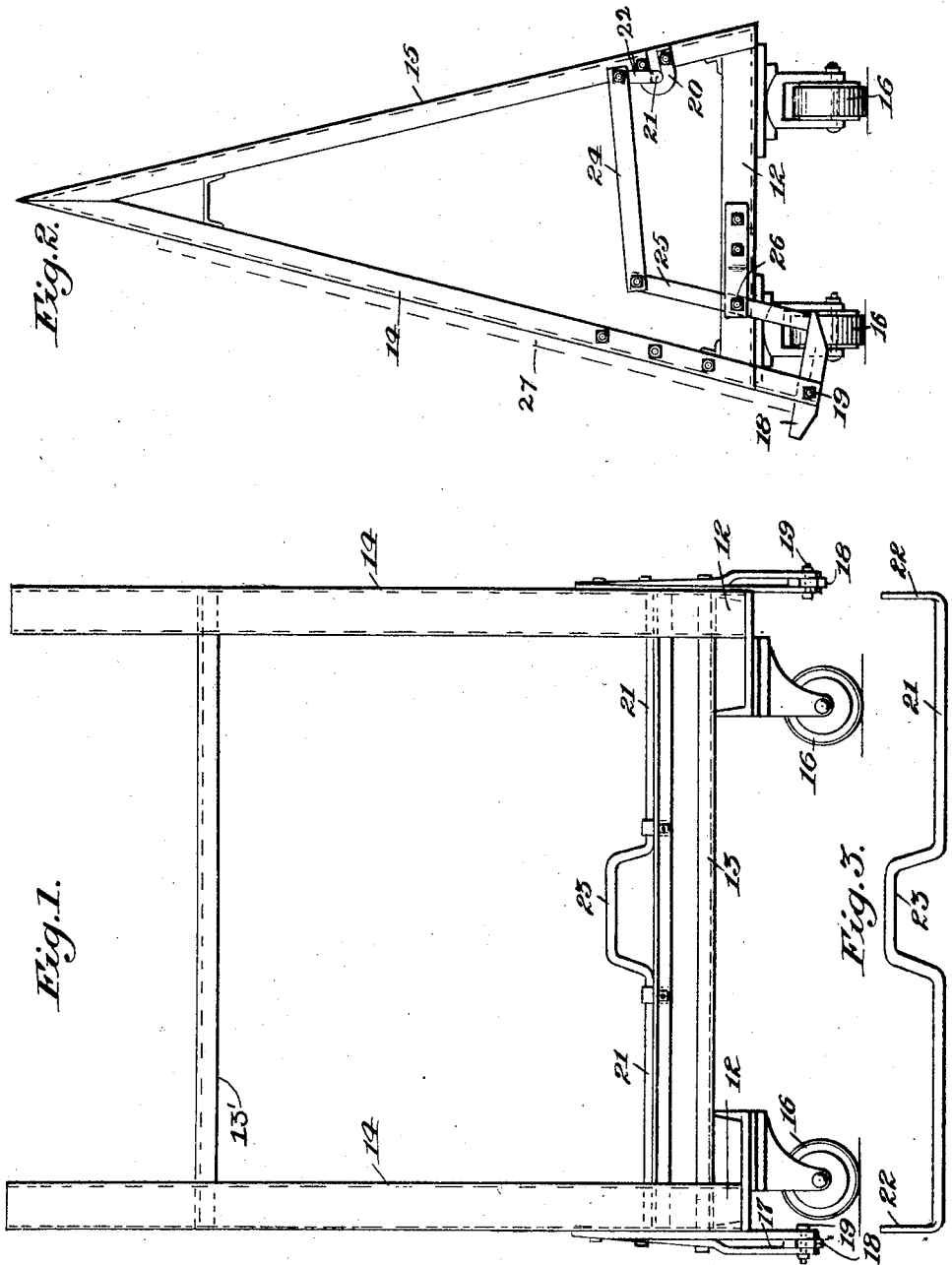

Patented Mar. 27, 1928.

1,663,571

UNITED STATES PATENT OFFICE.

FRANK RUSSELL SHEDD, OF CENTER RUTLAND, VERMONT, ASSIGNOR TO VERMONT MARBLE COMPANY, A CORPORATION OF VERMONT.

TRUCK.

Application filed April 6, 1927. Serial No. 181,477.

This invention relates to a truck primarily intended for handling slabs of marble or other thin and heavy articles in loading them into railway cars or in otherwise moving them about, and has for its object to provide a strong and efficient construction whereby the heavy slabs may be conveniently handled, as will hereinafter more fully appear.

In the accompanying drawing Fig. 1 is a side view of the improved truck and Fig. 2 is an end view of the same. Fig. 3 is a detail view of the operating device for releasing the levers on which the slab is supported.

Referring to the drawing, the frame-work of the truck comprises angle-iron cross bars 12, angle-iron longitudinal bars 13, and inclined uprights 14 and 15 secured together at their tops and properly attached to said cross and longitudinal bars. This frame-work is mounted on rollers 16.

Bolted to the uprights 14 are depending bars 17 each preferably consisting of two parts separated at their lower ends. Between these separated parts are mounted slab-supporting levers 18 fulcrumed on bolts 19. Mounted in brackets 20 attached to the uprights 15 is an operating shaft 21 having cranks 22 at its opposite ends and having a central handle 23. Jointed to the cranks 22 are links 24 which are also jointed to holding levers 25 fulcrumed on bolts 26 mounted on the cross bars 12. The lower ends of the levers 25 abut against the levers 18 so as to hold the said levers 18 in the operative position shown in Fig. 2.

A slab to be loaded will be landed on cleats several inches in thickness near the car door by an overhead crane. With the parts in the positions shown in Fig. 2 the truck will be tilted over so as to enable the outwardly projecting ends of the levers 18 to extend beneath the slab, and the truck is then moved back to an upright position with a slab 27 resting against the uprights 14. The truck is then rolled into the car and the shaft 21 is turned by its handle portion so as to cause the links 24 to release the levers 25 from the levers 18, thus releasing the said levers 18 so that the slab may be dropped to the floor of the car, or onto cleats or bars on the car floor.

It will be understood from the drawings that the frame-work of the improved truck has a broad base which is mounted on four wheels, to adapt it for carrying heavy slabs or similar large heavy articles, and that there is a slab-supporting lever at each end of the truck, with a set of holding levers and links for each of said supporting levers; the construction being such that the article to be transported will be mounted longitudinally of the truck and in the line of travel thereof on said wheels.

It will be seen from the drawing that the uprights 14 of the frame-work are joined together near their tops by the upper angle-iron longitudinal bar 13' and that said uprights are joined to the angle-iron cross-bars 12 by the lower longitudinal angle-iron bars 13, thus providing a very strong metal frame-work of endwise triangular form, as shown in Fig. 2.

As all the parts of the improved truck are preferably of metal it will be understood that the invention provides a strong and convenient truck by which slabs of stone or other heavy thin articles, which must be carried edgewise, may be conveniently handled in loading or unloading them or otherwise.

Having thus described my invention I claim and desire to secure by Letters Patent:

1. A truck consisting of an endwise triangular four-wheeled frame-work comprising sets of inclined uprights and a broad base, cross bars connecting said uprights together near said base, lower longitudinal bars connecting said uprights to said cross-bars, and an upper longitudinal bar connecting said uprights together near their tops, one set of said uprights having depending extensions, a slab-supporting lever pivoted to one of said said extensions at each end of the truck, holding levers engaging said supporting levers, and means for releasing the said holding levers from said supporting levers.

2. A truck consisting of a four-wheeled frame-work comprising sets of inclined uprights and a broad base, cross-bars connecting said uprights together near said base, lower longitudinal bars connecting said uprights to said cross-bars, and an upper longitudinal bar connecting said uprights together near their tops, one set of said uprights having depending extensions at each end of the truck, a slab-supporting lever pivoted to one of said extensions at each end of the truck, holding levers engaging said supporting levers, links connected with said last-named levers, and a crank shaft supported by one set of said uprights and having cranks at its opposite ends by which said links may be moved to release the said holding levers from said supporting levers.

In testimony whereof I affix my signature.

FRANK RUSSELL SHEDD.